No. 765,300. PATENTED JULY 19, 1904.
C. R. WILLIAMS.
MECHANIC'S COMBINATION MEASURING IMPLEMENT.
APPLICATION FILED JAN. 12, 1904.
NO MODEL.
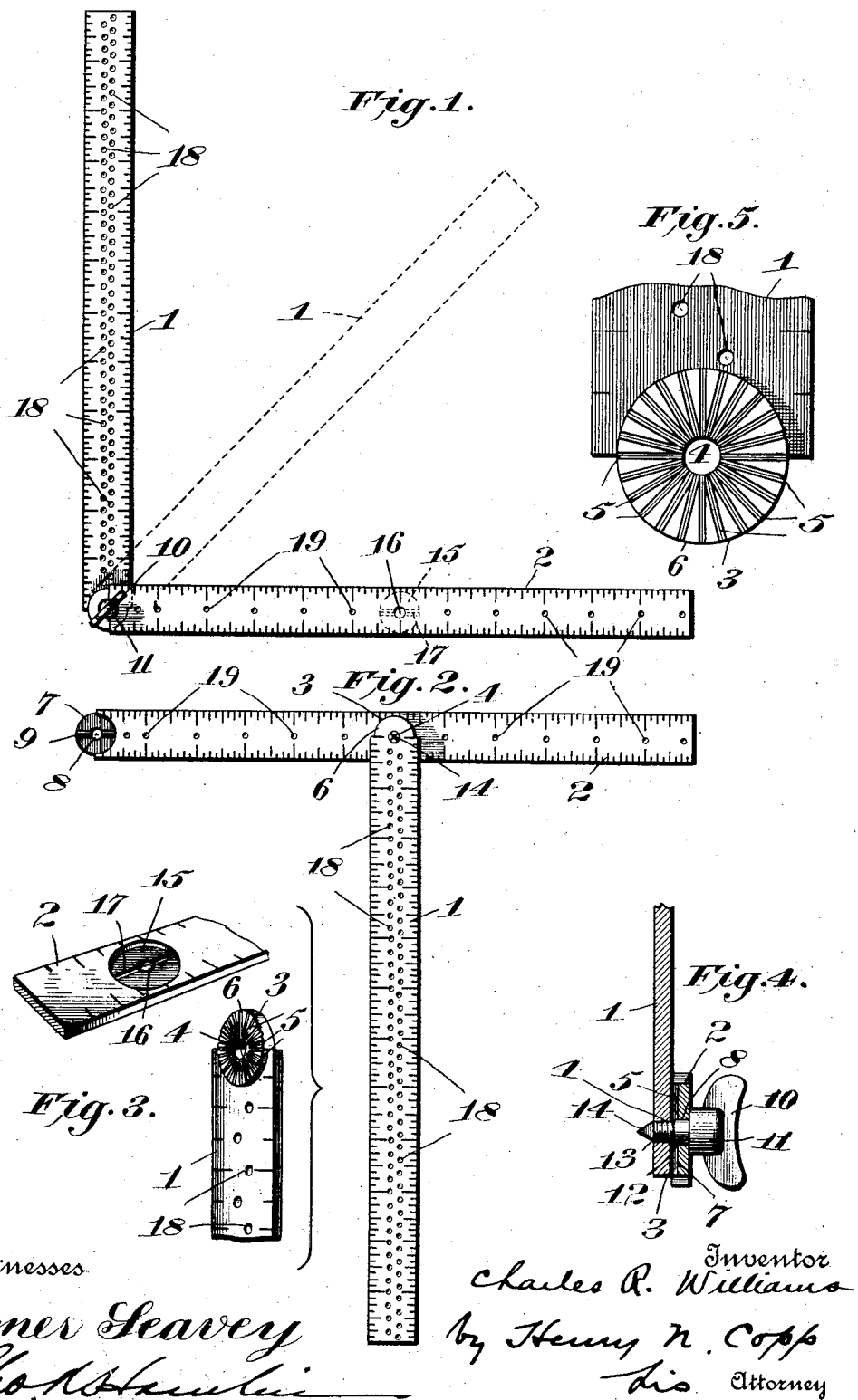
Witnesses
Elmer Seavey
Geo. A. Hamlin
Inventor
Charles R. Williams
by Henry N. Copp
his Attorney No. 765,300.

Patented July 19, 1904.

UNITED STATES PATENT OFFICE.

CHARLES R. WILLIAMS, OF NORTH CHICAGO, ILLINOIS.

MECHANIC'S COMBINATION MEASURING IMPLEMENT.

SPECIFICATION forming part of Letters Patent No. 765,300, dated July 19, 1904.

Application filed January 12, 1904. Serial No. 188,762. (No model.)

*To all whom it may concern:*

Be it known that I, CHARLES R. WILLIAMS, a citizen of the United States, residing at North Chicago, county of Lake, and State of Illinois, have invented certain new and useful Improvements in Mechanics' Combination Measuring Implements, of which the following is a specification.

This invention relates to mechanics' combination measuring implements.

The object of the present invention is the provision of a measuring implement having means for the adaptation thereof as an ordinary carpenter's square, try-square, miter or bevel square, T-square, T bevel-square, gage, compass, and calipers, besides being adapted for a variety of other uses, which will be compact and of convenient form, cheap to produce, and accurate.

One of the principal objects of the present invention is the provision of an improved locking-joint for the parts of the device, whereby after it has once been adjusted accidental derangement of the legs of the implement will be absolutely prevented and an exactitude of adjustment insured, this joint being arranged so that it is used whatever purpose the device may be put to.

The invention embraces those certain novel features of construction and adaptations of parts set forth fully hereinafter and recited in the appended claim.

In the accompanying drawings, Figure 1 is a plan view showing the use of the invention as a square, dotted lines illustrating how the legs can be relatively adjusted. Fig. 2 is a similar view showing how one leg can be connected to the center of the other leg. Fig. 3 represents details of the improved locking-joint; Fig. 4, a sectional detail of the locking-joint, showing the clamping-screw in full lines; and Fig. 5, an enlarged detail plan of the protractor of the locking-joint.

The legs of the implement are shown at 1 and 2, being provided with suitable scales on both sides thereof. The leg 1 has at one end a raised circular hub 3, having a screw-threaded opening 4 extending therethrough centrally thereof and a plurality of diametrical grooves 5 in any desired number. This raised protractor will preferably be graduated into twenty-four or more regularly-spaced divisions to give any angle that would ordinarily be desired. The end of the rule where the protractor is located is curved at 6, and the opening 4 is in line with the squared end of the rule or leg 1. The leg 2 is provided at its end with a circular depressed portion 7 of proper size to suitably receive the raised hub or protractor 3, and an opening 8 extends centrally through this circular part 7 and in line with the end of the leg 2, while a rib 9 is disposed diametrically of the circular depressed part 7 and is adapted to take into any of the diametrical grooves 5 to lock the legs 1 and 2 at the desired angle in relation to each other. A wing or thumb screw 10 has its head 11 bearing on the leg 2 and its shank provided with a blank portion 12 where passing through the opening 8 and a screw-threaded portion 13 to engage the screw-threads of the opening 4, the point 14 of the shank extending beyond the leg 1 to constitute a center when the device is used as a compass. The engagement of the threads 13 with the threaded opening 4 causes the rib 9 to lock into the desired groove 5, and the locking-joint thus provided absolutely safeguards against accidental displacement of either of the legs in relation to the other leg.

Intermediate the ends of the leg 2 there is provided a depression 15, similar to the depression 7, having an opening 16 and a diametrical rib 17 for the reception of the raised protractor 3 and the locking of the same to the rib 17 by the thumb-screw when it is desired to use the device as a T-square or a T bevel-square. This feature is very useful, as all the advantages of such use are obtained without any liability of loosening of the joint.

In the leg 1 I provide a plurality of staggered holes 18 for the reception of a scribing implement of any kind to draw a large number of circles of different diameters, these openings having a certain relation to the scales on the leg 1, so that the user can immediately draw a circle of the desired radius or diameter, while in the leg 2 a number of openings 19 are provided for the inscribing of circles whose diameters vary considerably.

Various uses to which this device can be put will be obvious to any one skilled in the art. When the legs are connected together at their ends, the device can be used as a miter-square, as a try-square, and as an ordinary square, as a rule and also as a gage and calipers, and various circles can be struck, while the implement is adaptable for use as a T-square and a T bevel-square when the leg 1 is connected to the center of the leg 2.

I am aware that it has been proposed heretofore to connect the legs of a mechanic's implement of this general character by a screw having a point projecting and to use holes in the legs, so that the device can be used as a compass, and I also know that the idea of connecting one of the legs to the other intermediate the ends thereof to provide a T-square has been proposed heretofore; but, so far as I am aware, I am the first to provide the novel locking-joint on a device of this character, whereby after adjustment has once been effected the legs cannot move in relation to each other, and the provision of this joint intermediate the ends of one of the legs is also my invention.

Having thus described my invention, what I claim as new, and desire to secure by Letters Patent, is—

In a mechanic's combination measuring implement, the combination of two legs or members, one of which has a raised circular protractor provided with a screw-threaded central opening and grooves radiating therefrom, and the other member having a circular depressed portion receiving the raised protractor and provided with a rib to engage the grooves aforesaid and also having a central opening, and a screw-threaded adjustable member passing through the opening last named and engaged with the screw-threaded opening to lock the rib in the grooves.

In testimony whereof I hereunto affix my signature in presence of two witnesses.

CHARLES R. WILLIAMS.

Witnesses:
R. T. WEATHERLY,
WALLIE WILLIAMS.